(12) United States Patent
Carothers

(10) Patent No.: US 7,853,101 B2
(45) Date of Patent: Dec. 14, 2010

(54) BI-RATE ADAPTIVE OPTICAL TRANSFER ENGINE

(75) Inventor: Daniel N. Carothers, Oro Valley, AZ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 155 days.

(21) Appl. No.: 12/202,024

(22) Filed: Aug. 29, 2008

(65) Prior Publication Data

US 2010/0054658 A1  Mar. 4, 2010

(51) Int. Cl.
*G02B 6/28* (2006.01)

(52) U.S. Cl. .......................... 385/24; 385/15

(58) Field of Classification Search .................. 385/15, 385/24

See application file for complete search history.

(56) References Cited

U.S. PATENT DOCUMENTS

| | | |
|---|---|---|
| 4,420,258 A | 12/1983 | Burns et al. |
| 4,547,072 A | 10/1985 | Yoshida et al. |
| 4,748,617 A | 5/1988 | Drewlo |
| 4,829,165 A | 5/1989 | Kalawsky |
| 4,921,354 A | 5/1990 | SooHoo |
| 5,165,001 A | 11/1992 | Takagi et al. |
| 5,281,805 A | 1/1994 | Sauer |
| 5,371,591 A | 12/1994 | Martin et al. |
| 5,430,755 A | 7/1995 | Perlmutter |
| 5,625,636 A | 4/1997 | Bryan et al. |
| 5,674,778 A | 10/1997 | Lee et al. |
| 5,703,989 A | 12/1997 | Khan et al. |
| 5,736,461 A | 4/1998 | Berti et al. |
| 5,828,476 A | 10/1998 | Bonebright et al. |
| 5,834,800 A | 11/1998 | Jalali-Farahani et al. |
| 5,926,303 A | 7/1999 | Giebel et al. |
| 5,999,284 A | 12/1999 | Roberts |
| 6,117,771 A | 9/2000 | Murphy et al. |
| 6,242,324 B1 | 6/2001 | Kub et al. |
| 6,306,722 B1 | 10/2001 | Yang et al. |
| 6,331,445 B1 | 12/2001 | Janz et al. |
| 6,387,720 B1 | 5/2002 | Misheloff et al. |
| 6,400,996 B1 | 6/2002 | Hoffberg et al. |

(Continued)

FOREIGN PATENT DOCUMENTS

EP  0 818 693 A1  1/1998

(Continued)

OTHER PUBLICATIONS

PCT Search Report dated Oct. 15, 2009 of Patent Application No. PCT/US2009/055205 filed Aug. 27, 2009.

(Continued)

*Primary Examiner*—Jennifer Doan
(74) *Attorney, Agent, or Firm*—Vern Maine & Associates; Andrew P. Cernota

(57) ABSTRACT

One embodiment of the present invention provides a system for the transmission of data between an optical bus and an electronic component at a speed independent from a clock speed of the electrical component; the system comprising an optical data storage component communicating with both the optical bus and the electrical component; the optical data storage component being configured to hold data transmitted on the optical bus until said electrical component is available.

10 Claims, 9 Drawing Sheets

U.S. PATENT DOCUMENTS

| | | | |
|---|---|---|---|
| 6,477,285 B1 | 11/2002 | Shanley | |
| 6,605,809 B1 | 8/2003 | Engels et al. | |
| 6,677,655 B2 | 1/2004 | Fitzgerald | |
| 6,680,495 B2 | 1/2004 | Fitzgerald | |
| 6,725,119 B1 | 4/2004 | Wake | |
| 6,738,546 B2 | 5/2004 | Deliwala | |
| 6,785,447 B2 | 8/2004 | Yoshimura et al. | |
| 6,795,622 B2 | 9/2004 | Forrest et al. | |
| 6,807,372 B1 * | 10/2004 | Lee et al. | 398/78 |
| 6,850,252 B1 | 2/2005 | Hoffberg | |
| 6,861,369 B2 | 3/2005 | Park | |
| 6,936,839 B2 | 8/2005 | Taylor | |
| 6,968,110 B2 | 11/2005 | Patel et al. | |
| 7,006,881 B1 | 2/2006 | Hoffberg et al. | |
| 7,010,208 B1 | 3/2006 | Gunn, III et al. | |
| 7,043,106 B2 | 5/2006 | West et al. | |
| 7,072,556 B1 | 7/2006 | Gunn, III et al. | |
| 7,082,247 B1 | 7/2006 | Gunn, III et al. | |
| 7,103,252 B2 | 9/2006 | Ide | |
| 7,139,448 B2 | 11/2006 | Jain et al. | |
| 7,215,845 B1 | 5/2007 | Chan et al. | |
| 7,218,809 B2 | 5/2007 | Zhou et al. | |
| 7,218,826 B1 | 5/2007 | Gunn, III et al. | |
| 7,254,813 B2 | 8/2007 | Leong et al. | |
| 7,257,051 B2 | 8/2007 | Thomenius et al. | |
| 7,259,031 B1 | 8/2007 | Dickinson et al. | |
| 7,272,279 B2 | 9/2007 | Ishikawa et al. | |
| 7,315,679 B2 | 1/2008 | Hochberg et al. | |
| 7,333,679 B2 | 2/2008 | Takahashi | |
| 7,348,230 B2 | 3/2008 | Matsuo et al. | |
| 7,356,221 B2 | 4/2008 | Chu et al. | |
| 7,418,174 B2 | 8/2008 | Hirose | |
| 2003/0020144 A1 | 1/2003 | Warble et al. | |
| 2003/0026546 A1 | 2/2003 | Deliwala | |
| 2003/0183825 A1 | 10/2003 | Morse | |
| 2004/0146431 A1 | 7/2004 | Scherer et al. | |
| 2004/0190274 A1 | 9/2004 | Saito et al. | |
| 2004/0268011 A1 * | 12/2004 | Arita et al. | 710/312 |
| 2005/0094938 A1 | 5/2005 | Ghiron et al. | |
| 2005/0259944 A1 | 11/2005 | Anderson et al. | |
| 2006/0105509 A1 | 5/2006 | Zia et al. | |
| 2006/0158723 A1 | 7/2006 | Voigt et al. | |
| 2006/0238866 A1 | 10/2006 | Von Lerber | |
| 2006/0240667 A1 | 10/2006 | Matsuda et al. | |
| 2007/0116398 A1 | 5/2007 | Pan et al. | |
| 2007/0202254 A1 | 8/2007 | Ganguli et al. | |
| 2008/0159751 A1 | 7/2008 | Matsui et al. | |
| 2008/0240180 A1 | 10/2008 | Matsui et al. | |

FOREIGN PATENT DOCUMENTS

| | | |
|---|---|---|
| EP | 1 067 409 A2 | 1/2001 |
| WO | 93/14514 | 7/1993 |
| WO | 01/27669 A1 | 4/2001 |
| WO | 02/16986 A1 | 2/2002 |
| WO | 2004/088724 A2 | 10/2004 |
| WO | 2007/149055 A1 | 12/2007 |

OTHER PUBLICATIONS

Pruessner, Marcel W. et al., "InP-Based Optical Waveguide MEMS Switches with Evanescent Coupling Mechanism", Journal of Microelectromechanical Systems, Oct. 2005, pp. 1070-1081; vol. 14, No. 5.

IBM TDB; "Integrated Process for Silicon Nitride Waveguide Fabrication"; IBM Technical Disclosure Bulletin, Jul. 1990, pp. 156-157.

Matsushita, A. et al., "Narrow $CoSi_2$ Line Formation on $SiO_2$ by Focused Ion Beam", IEEE, 1999, pp. 861-864.

Kimerling, L.C. et al., "Electronic-Photonic Integrated Circuits on the CMOS Platform", Silicon Photonics, 10 pages, vol. 6125.

Liu, Jifeng et al., "Design of Monolithically Integrated GeSi Electro-Absorption Modulators and Photodetectors on an SOI Platform", Optics Express, 2007, pp. 623-628, vol. 15, No. 2.

Fijol, J.J. et al., "Fabrication of Silicon-On-Insulator Adiabatic Tapers for Low Loss Optical Interconnection of Photonic Devices", SPIE, 2003, 14 pgs.

Yap, D. et al., "Integrated Optoelectronic Circuits with InP-Based HBTs", Optoelectrical Integrated Circuits and Packaging V, Proceedings of SPIE, 2001, pp. 1-11, vol. 4290.

Roth, Jonathan Edgar, "Electroabsorption Modulators For CMOS Compatible Optical Interconnects in III-V and Group IV Materials", Submitted to the Dept. of Electrical Eng. and the Committee on Graduate Studies of Stanford University, Aug. 2007, 207 pgs.

Okyay, Ali K. et al., "Silicon Germanium CMOS Optoelectronic Switching Device: Bringing Light to Latch", IEEE Transactions on Electron Devices, 2007, pp. 3252-3259, vol. 54, No. 12.

McAulay, Alastair D., "All-Optical Switching and Logic with an Integrated Optic Microing Resonator", Proc. of SPIE, 2005, pp. 16-22, vol. 5814.

Chao, Fang-Lin et al., "Analysis of Temperature Profiles of Thermo-Optic Waveguides", Fiber and Integrated Optics, 1994, pp. 397-406, vol. 13.

Kik, P.G. et al., "Erbium Doped Optical Waveguide Amplifiers on Silicon", MRS Bulletin, Apr. 1998, 7 pgs.

"Chapter 13: Process Integration", National Tiapei University of Technology.

L.C. Kimerling et al., "Electronic-Photonic Integrated Circuits on the CMOS Platform", Joint Report sponsored under Defense Advanced Research Projects Agency's EPIC Program and executed by the Microsystems Technology Office, ARPA Order No. T239/03, Program code 4H20 (no date of publication), pp. 1-10.

J.S. Kimmet, "Chapter 6—Integrated Circuit Fabrication Details", M.S. Thesis, 18 pgs.

* cited by examiner

BI-RATE ADAPTIVE OPTICAL TRANSFER ENGINE

FIELD OF THE INVENTION

The present invention relates to the field of photonic communications devices and more particularly to a system to allow testing of devices for the transfer of data between a optical bus and electrical components having different clock speeds.

BACKGROUND OF THE INVENTION

Optical busses operate at high bus speeds, unmatched by even the most advances electronic components. The pairing of such electrical devices with optical devices can lead to latency and conflicts. As optical busses evolve to operate at data rates beyond the capability of current characterization equipment, there is a need to develop test and evaluation methods that allow accurate characterization while decoupling the characterization from electronic test equipment and methods that will induced their own lag and latency to the measurements.

SUMMARY OF THE INVENTION

One embodiment of the present invention provides a system for interface between an optical bus and electronic component, the system comprising An optical transfer array for receiving and transmitting data to and from the electronic component; an optical decode/encode matrix reading data transmitted from the electronic component uploaded to the transfer array, and writing control data to switches disposed within the transfer array and providing a plurality of addresses for optical guides in the optical bus.

Another embodiment of the present invention provides such a system wherein the transfer array further comprises a plurality of optical latches controlled by the switches, the optical latches being configured to store the data until it can be retrieved by the optical bus.

A further embodiment of the present invention provides such a system wherein the optical bus is a serial bus.

Yet another embodiment of the present invention provides such a system wherein the optical bus is a parallel bus.

A yet further embodiment of the present invention provides such a system wherein the latches within the plurality of optical latches comprise first and second interferometers.

One embodiment of the present invention provides a system for the transmission of data between an optical bus and an electronic component at a speed independent from a clock speed of the electrical component; the system comprising an optical data storage component communicating with both the optical bus and the electrical component; the optical data storage component being configured to hold data transmitted on the optical bus until the electrical component is available.

Another embodiment of the present invention provides such a system, wherein the storage component comprises an optical latch.

A further embodiment of the present invention provides such a system wherein the optical storage component provides a dual cavity.

Yet another embodiment of the present invention provides such a system wherein the system is provided with high index contrast.

A yet further embodiment of the present invention provides such a system wherein the system has low loss.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

One embodiment of the present invention provides a bi-rate adaptive optical transfer solution enabled by a series of complex optical components based on the combination of close coupled optical gain materials and existing photonic structures. These integrated optical components will allow full interface with the high speed optical bus bypassing the power and frequency limitations imposed by the application of silicon modulators, germanium detectors, and their related control circuits.

In one embodiment of the present invention an integrated optical gain material is used to realize an all optical bus architecture. These optical gain structures when combined within existing EPIC optoelectronic processing environment will provide us with the building blocks to develop the more complex components necessary to build out the full architecture.

Figure 1:
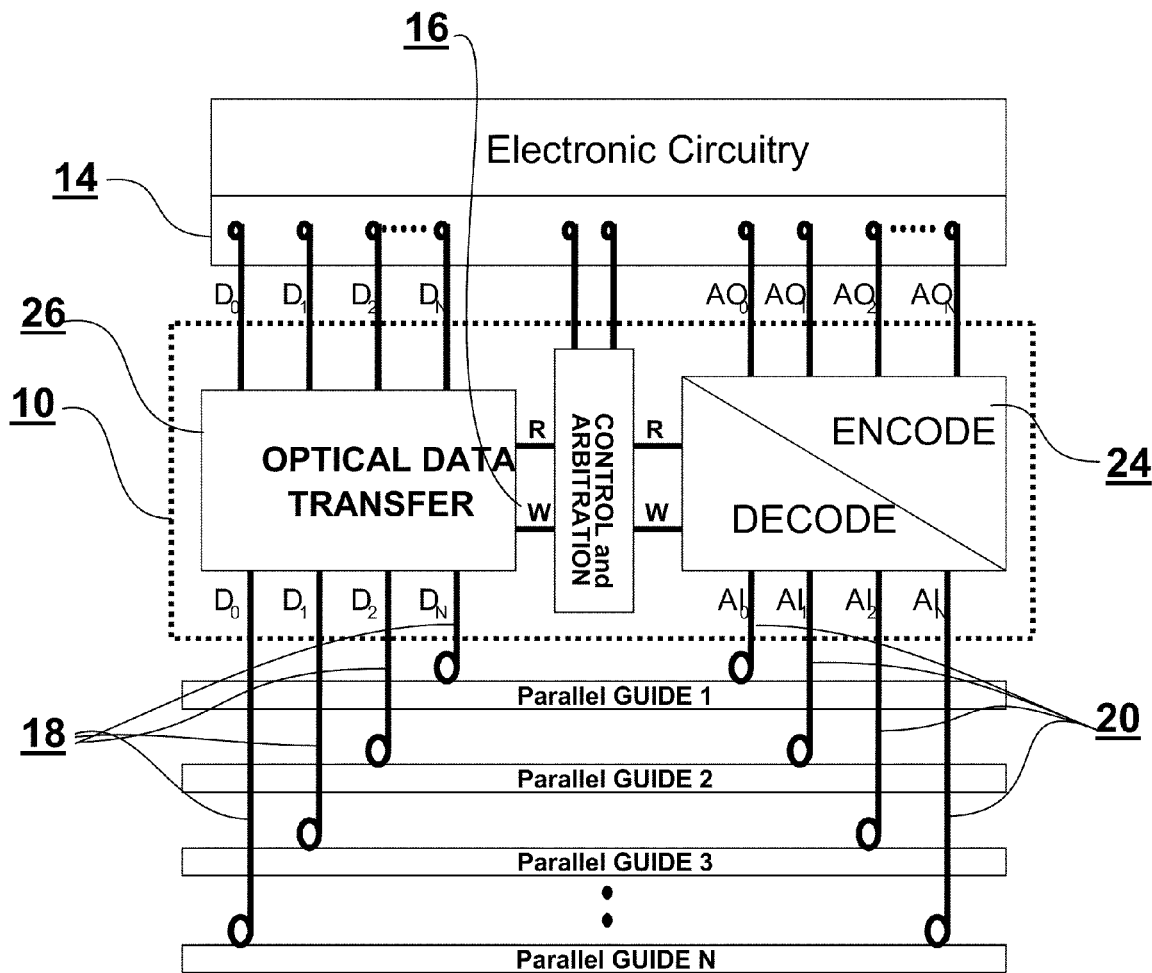
FIG. 1 is a block diagram illustrating a bi-rate adaptive interface configured in accordance with one embodiment of the present invention.

The basic architecture of one embodiment of the present invention at the cell level is illustrated in FIG. 1. In such an embodiment the data is clocked into a series of optical latches within a Bi-rate optically Addressed Interface 10. Electronic operations 12 including an electronic cell such as a memory, processes core or other known electrical component, are coupled to a bi-rate optically addressed interface 10 via an electrically clocked interface 14. The bi-rate interface 10 is coupled to at least one optical bus via optically clocked interface 16. In one embodiment, such as that illustrated in FIG. 1, an Optical Data bus 18, an Optical Address bus 20, and an Optical control bus (not shown) may be provided. The bi-rate interface 10 allows the electrical interface to upload and receive data at an electrical clock rate, while the optical bus 14 is configured to transmit and receive data from the bi-rate interface at the higher optical clock rate.

Figure 2:
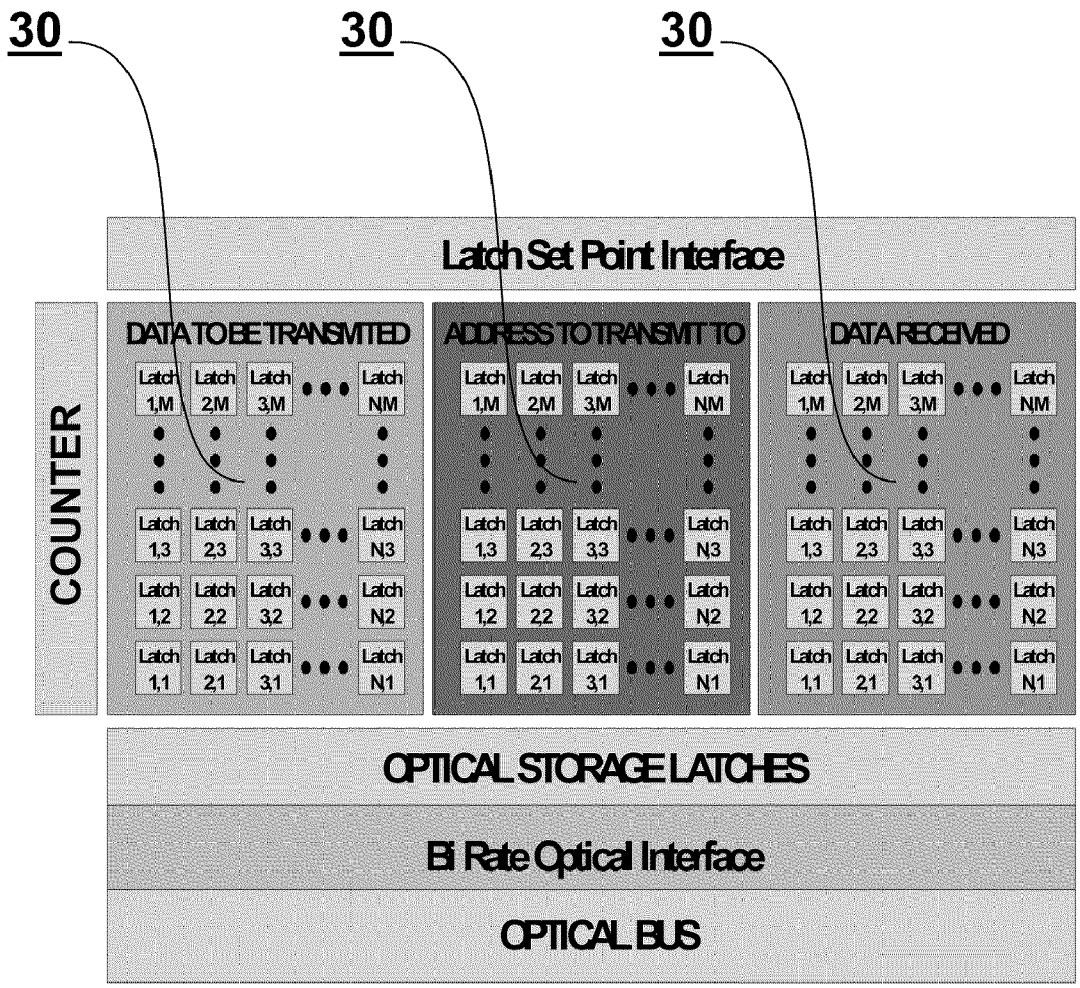
FIG. 2 is a block diagram illustrating a bi-rate adaptive interface with optical storage latches configured in accordance with one embodiment of the present invention.

This interface is further illustrated in FIG. 1. The bi-rate interface comprises an optical decode/encode matrix 24 communicating with the electronic circuitry 12 and at least one optical bus 14 the optical bus being provided with a plurality of wave guides having assigned addresses. The bus 14 may be either parallel or serial in configuration. Data ($D_0$-$D_n$) received is received by an optical data transfer module 26 disposed within the bi-rate interface. Data bits, including address and control information that are unable to be directly processed by the electronic circuitry due to the slower clock time are stored in optical latches 30, as illustrated in FIG. 2. These latches 30 store the data bit until the electronic circuit is ready to process it, or the data bit is uploaded and is ready to be transferred to the optical bus 14. The stored data can then be clocked in (or out of) latches 30 at the clock rate of the common optical bus. The application of optically switched and routed data will allow the elimination of extra E-O (electronic to optical) conversions normally needed to identify and extract data as well as reduce the number of optical links needed to transmit this data. The electronic component writes a state to the latch 30. Once the bus 14 comes active the information is rapidly clocked into the optical bus 14 through the second latch 26. Slightly simpler output architecture can be achieved by running the output of the latch 30 through an optically addressed bus switch. This can be further extended by combining latches to achieve a serial to parallel converter to rapidly burst in data serially at each wavelength.

In such an embodiment information is moved to and from the electronic circuitry without introducing latency to the operation of the optical bus while at the same time providing a method of simplistic bus arbitration in the case of wavelength division multiplexing (WDM) operation of the busses. Such an embodiment can be extended to allow simultaneous encoding of multiple data words as either multiple wavelengths on a single wavelength or multiple wavelengths on parallel waveguides as shown in FIG. 2.

Figure 3:
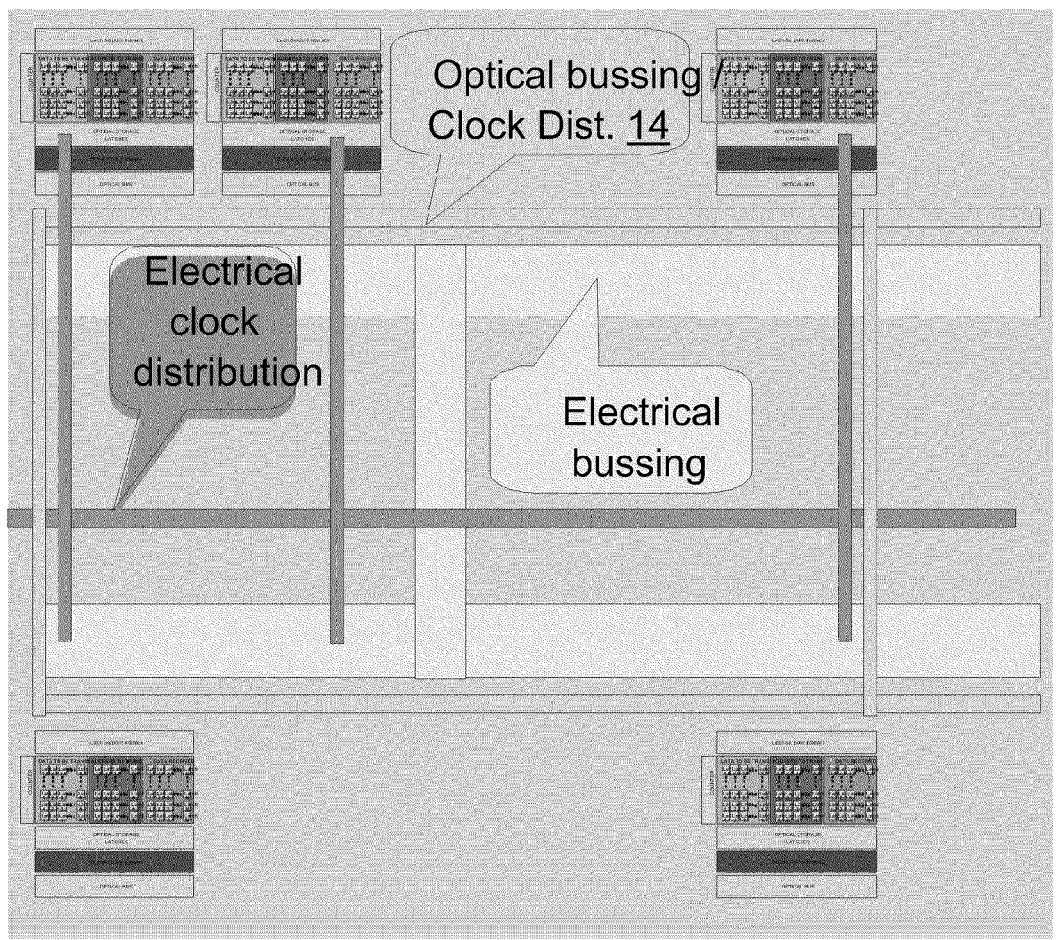
FIG. 3 is a block diagram illustrating a system implementing a bi-rate adaptive interface with optical storage latches configured in accordance with one embodiment of the present invention.

As illustrated in FIG. 3 a plurality of electronic cells may be connected to a single optical bus 14 via a plurality of bi-rate interfaces 10 One skilled in the art will readily appreciate that this configuration permits scalability of the design.

Because modern military systems require ever increasing data throughput, the initial demonstration vehicle for this technology is a digital signal processor (DSP) architecture. The huge volumes of data necessitate implementation of a large number of parallel cores. Because the DSP processing cores are identical, development cost and risk is minimized and focus can be placed on optimization of the execution core itself and with its interfaces to optical clock distribution and busses.

A Bi-rate optically Addressed Interface, such as that of one embodiment of the present invention, will allow development of photonic communications networks that will enable multi-processors with hundreds to thousands of compute cores. Our proposed technology will allow scalling from multi to mega core architectures.

One embodiment of the present invention provides for photonics employed for architectural elements with high fan out used for processor control such as clocks and reset lines, and also for wide data, address, and control busses where photonics result in significantly less lines and interconnections. Photonic signals do not experience either the performance limitations associated with R-C time constants or increasing power dissipation proportional to increasing capacitance load that occur in metal interconnect. These limitations have already been experienced with current processors such as the Intel Pentium where multiple pipeline clock cycles are required to move from one side of the chip to the other. Similarly, micro-architecture of the TRIPS polymorphic processor is designed to eliminate global routing by making connections only between adjacent tiles because of wiring delay constraints. Optical busses will eliminate these constraints simplifying processor architecture. These connections interface with all electronic processing and memory macros to maintain optimal density and power dissipation.

One embodiment of the present invention provides improved simplicity of the coding. The more complex the programming requirements for any electronic component the greater the number of on chip operations to implement it. Programming is simplified for a multi-processor, because the effects of core relative placement vs. latency and throughput no longer need to be considered. Code designed for a small number of tightly packed cores is able to employ the same approach as a much larger number of cores spread across greater distances. Our proposed architecture enables us to optically control the addressing of locations in a similar manor to an electronic bus making our implementation transparent to the user/programmer. Because the changes to an existing digital signal processor architecture will occur at the physical layer, there is absolutely no adverse effect to supporting existing software or coding methods. Any existing infrastructure would be maintained, and all-electrical and hybrid hardware could be used interchangeably both for software development and operation as needed. The constraints currently associated with massively multiple core processors due to floor planning and wiring capacitance delays simply would not be incurred.

One embodiment of the present invention provides a number of benefits to the operational interactions with the individual electronic cell. Core-to-core communication in existing electrically-based multi-core architectures is already constrained by the effects of distance and R-C time constants. While lithography may allow increasing numbers of cores in a given silicon area, efficiency of throughput is constrained by the ability of a given core to communicate with others at full performance due to these limits in semiconductor physics. Use of optical bussing between cores eliminates the constraints of electrical characteristics and opens the option of universal connections. Although one embodiment of the present invention leans towards Digital Signal Processing (DSP) data processing, general processors employing multiple cores will benefit from this as well.

One over riding factor in any bus architecture are the effects of information latency and any latency in the distribution of information on the overall ability to accurately transmit data in a timely fashion. Latency associated with non-adjacent cores will be eliminated by this architecture, freeing up the ability to code software without regard to location of the execution unit on the die. Externally, latency associated with main memory accesses will be mitigated by optical chip-to-chip implementations. This allows simplification of the existing complex infrastructure for multiple level cache memories and increases throughput due to decreased latency in addressing and data transfer.

Alternatively, because optical power dissipation is not a function of frequency, optical clocking, bussing, and switching will allow significant extension of the practical limits of power-performance. In space-based systems, where the power-performance limitations are considerably more constrained due to limitations to conduction cooling, constrained generation of satellite power, and radiation effects, introduction of photonic elements will mitigate and possibly remove a barrier that has essentially already been reached.

As illustrated in FIG. 1, one embodiment of the present invention provides an architecture that employees an intermediary 10 that will allow the rapid transfer to and from the optical bus 14, while allowing the same information to be transferred to and from the electronic components at their own more leisurely clock cycle. To enable the lower clock rate electronic components to fully interface the high speed optical bus without introducing a limitation based on their much slower clock speed optical latch is introduced an will allow information to be loaded from the optical bus. To realize this type of optical storage element two nonlinear interferometers are provided creating an optical R-S flip-flop or optical latch.

Figure 4:
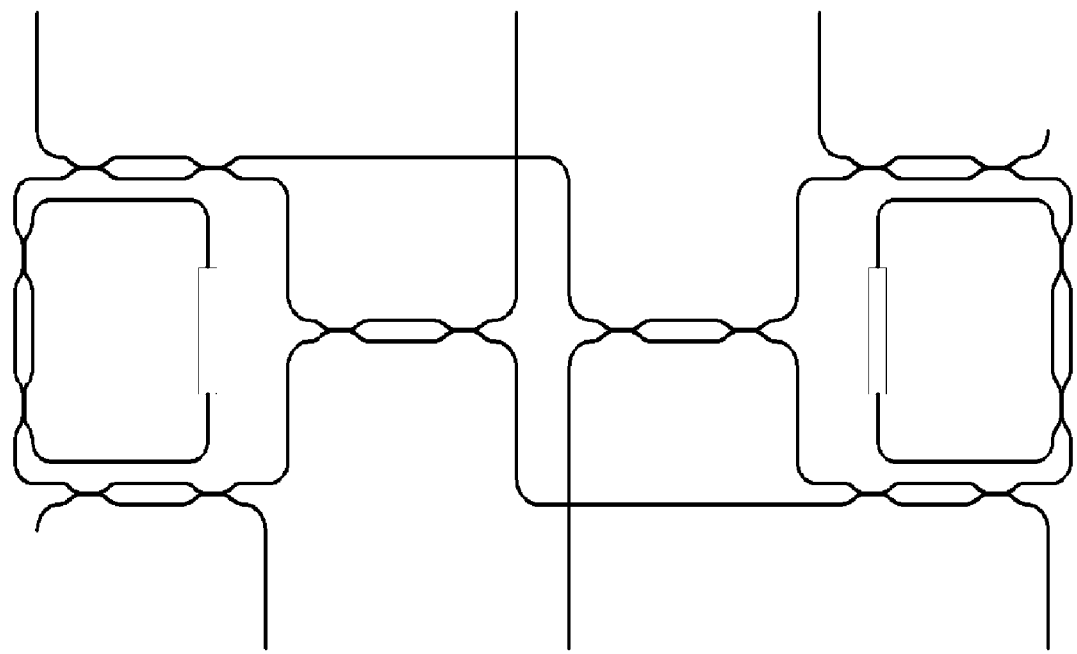
FIG. 4 is a block diagram illustrating the initial waveguide layout for an optical storage latch configured in accordance with one embodiment of the present invention.

In one embodiment of the present invention, the bi-rate adaptive interface of one embodiment of the present invention was first demonstrated in optical fiber, but was then integrated into known environment as illustrated in FIG. 4. In the embodiment illustrated in FIG. 4 the common cavity optical latch utilized dense integration of low loss waveguides in a way that allowed precise control of the optical phase. This control of the optical phase will allows optical modal switching between two common optical cavities and use of incident optical signals and manipulation of the phase within them to lock in one or the other configuration, thereby forming an optical latch.

One embodiment of the present invention will employ two basic configurations of existing components, including micro-resonators and integrated gain materials: a cascaded configuration to enable the basic optical logic functions and a more complex loop/mirror configuration Both of these configurations are employed in a complementary fashion to form the basic components of the optical data bussing scheme configured according to one embodiment of the present invention.

Figure 5:
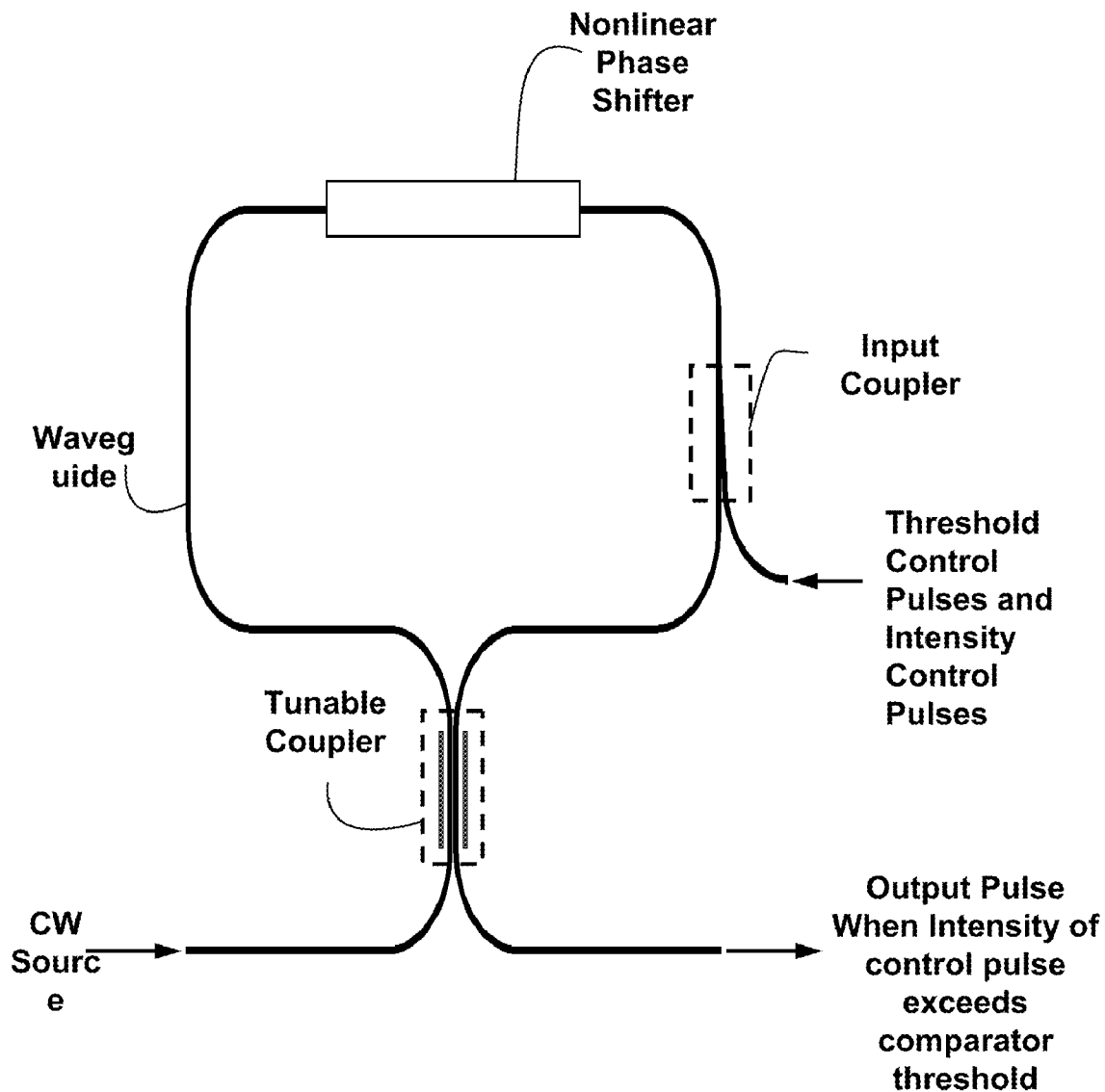
FIG. 5 is a block diagram illustrating a nonlinear interferometer optical comparator configured in accordance with one embodiment of the present invention.

In one embodiment of the present invention, a nonlinear optical mirror is provided, as shown in FIG. 5, a portion (determined by the coupler coupling factor k) of the pulse follows a clockwise path, and the remainder follows a counter-clockwise path. Because of phase shifts across the coupler both into and out of the loop, these pulses interfere and normally cancel on the output and add at the input.

Thus the net effect of such a configuration is reflection of the input pulse from the nonlinear optical mirror. This cancellation is assured in a Sagnac interferometer as the pulses transit identical paths and thus obtain equal phase shifts. By making the coupler unbalanced (70:30) instead of 50:50, the pulses in each direction have unequal intensities.

The nonlinear element then produces unequal phase shifts due to the unequal intensities. They then do not destructively interfere at the output, and the input pulse switches, or couples, to the output path. This intensity-dependent optical switching (or comparison) is shown in the graph is based upon Self Phase Modulation (SPM). Should a different pulse enter the control arm, the nonlinear phase shift is caused by Cross Phase Modulation (XPM).

Because the control pulse enters the loop in just one direction, it allows the coupler to be returned to 50:50 coupling, and the loop will switch between 0 and 100% of the input when the sum of the input plus the control intensity exceeds the loop threshold (differential phase shift of $\pi$). This provides a settable/changeable threshold for the optical comparator.

One embodiment of the present invention uses a single optical amplifier body of the nonlinear optical mirror. These small high Q, high finesse structures allow us to multiply the nonlinearity by the finesse of the amplifying optical cavity and control the optical properties of the transiting light with very low intensity input pulses which is critical for an efficient low power all optical switching mechanism.

Figure 6:
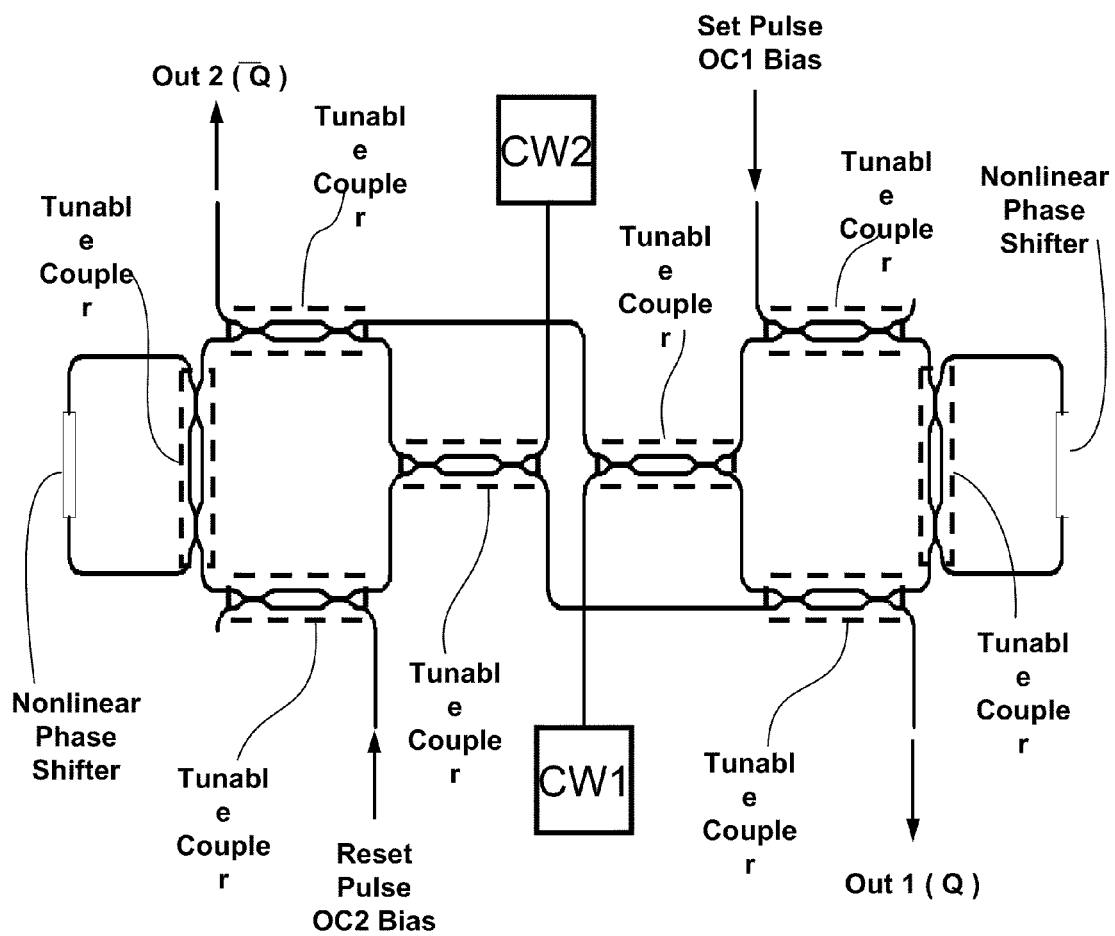
FIG. 6 is a block diagram illustrating a optical R-S Flip-Flop configured in accordance with one embodiment of the present invention.

In one embodiment of the present invention, two nonlinear interferometers create an optical R-S flip-flop or optical latch as illustrated in FIG. 6.

This optical latch is triggered on by the set pulse. After storage later it is triggered off by a reset pulse which allows the output from the much faster optical bus to be brought into a cell without slowing it down. By adding a second latch the gating of information to the bus can be controlled at a much greater rate of operation than could be achieved with the electronic component alone. A similar configuration will allow us to store and rapidly gate information to the optical bus. In this configuration the electronic component writes a state to the latch. And once the bus comes active the information is rapidly clocked into the optical bus through the second latch. Slightly simpler output architecture can be achieved by running the output of the latch through our optically addressed bus switch. This can be further extended by combining latches to achieve a serial to parallel converter to rapidly burst in data serially at each wavelength.

Nonlinear interferometers using nonlinear phase shifters have a long development history, and a lot of application names such as NOLM, NALM, TOAD, FROG, UNI, FUNI and on and on. They are used for multiplexers/demultiplexers, switches, add/drop devices, correlators, comparators, optical computing gates, and many more applications. While they have been demonstrated to successfully meet a myriad of application requirements, they have remained a laboratory demonstration device primarily due to the high peak powers needed to demonstrate the performance, and because of environmental sensitivity considerations. There has however been a steady progression in increasing the effective nonlinearity of fibers, and newer alternative, or equivalent nonlinearity devices. Table 1 shows the advances in fiber and device nonlinearity. Devices have shrunk from using 6-10 Km of fiber to hundreds of meters of fiber. New fibers (Bi doped and photonic xtal fiber) will further reduce these lengths. Engineered Nonlinearity Materials (ENM) and their horizon cousin three-dimensional nonlinear photonic bandgap structure devices, provide dramatic increases in nonlinearity (albeit at much shorter lengths—mm's, cm's).

These increases in nonlinearity enhance the obtainable sensitivity; while simultaneously shrinking the size; making the environmental issues easier; and PIC integration possible.

TABLE 1A $\chi 3$ And Cascaded $\chi 2{:}\chi 2$ Nonlinearity Coefficient ($\gamma$) Comparisons

| Effective Nonlinearity Coefficient | $\gamma$ (1/W-Km) |
|---|---|
| Normal Dispersion Shifted Fiber (DSF) | 2.7 |
| High Nonlinearity DSF (HNL-DSF) | 20 |
| New Bismuth Doped DSF (Bi-HNL-DSF) | 64.2 |
| Chalcogenide Glass Fiber/Waveguides | 2700 |
| Polymer, Organics, Nanocrystals | >1000000 |
| Semiconductor Optical Amplifier (SOA) | 6000000 |
| Cascaded $\chi 2{:}\chi 2$ Stoichiometric PPLN | 1080000 |
| Photonic Bandgap Devices | >1000000 |

TABLE 1A-continued

Representative Switching Power

| Material | Switching length | Power switched |
| --- | --- | --- |
| HNL-DSF | 350 m | 449 mW |
| SOA | 1.5 mm | 349 mW |
| S-PPLN | 5 cm | 58 mW |
| PBG | 0.1 mm | <1 mW |

Figure 7:
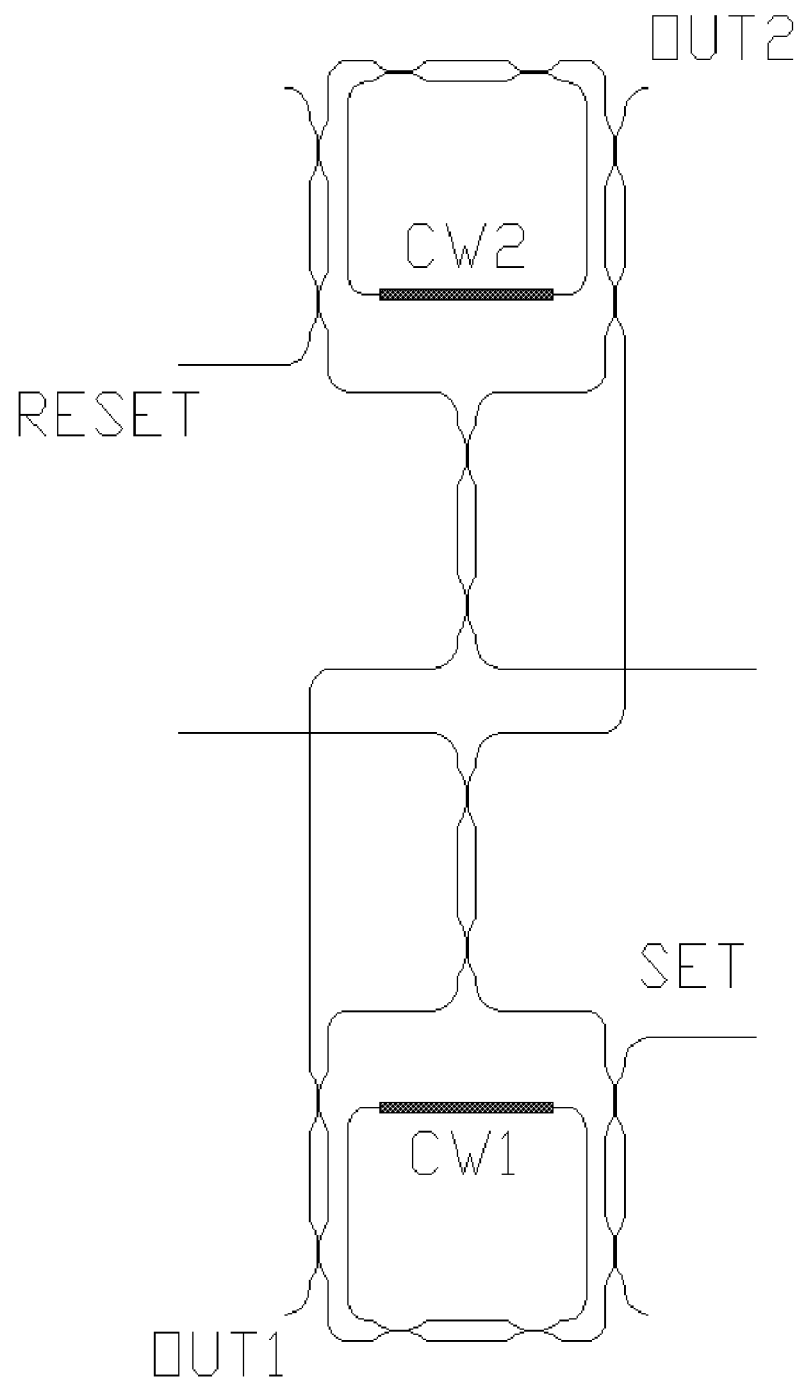
FIG. 7 is a block diagram illustrating an initial insertion of the gain materials into the structure of a latch configured in accordance with one embodiment of the present invention.

In one embodiment of the present invention, the nonlinearity and the gain media can be combined as shown in FIG. 7. Such an embodiment provides for better phase stability and control within the individual loops, however it became apparent that for the system to maintain the same operational modes as employed before that the phase alignment of the two half's had to be kept constant or modal competition was introduced that would suppress the desired output wavelength in one arm or another of the latch, i.e. when its state was changed would take a lot more power to reset than expected as it was required that balance be recovered. This lead us to the idea that we could greatly simplify this system by looking at the physical phenomena between two resonant cavities with gain.

Figure 8:
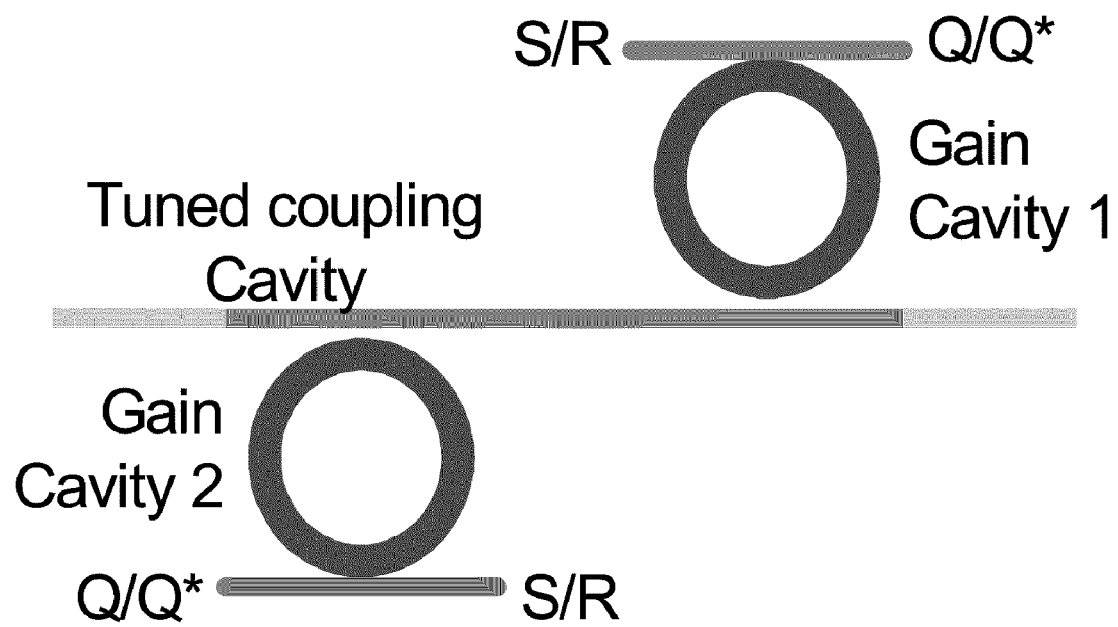
FIG. 8A is a block diagram illustrating an optical latch configured in accordance with one embodiment of the present invention.
FIG. 8B is a block diagram illustrating an optical latch configured in accordance with one embodiment of the present invention.
Figure 8:
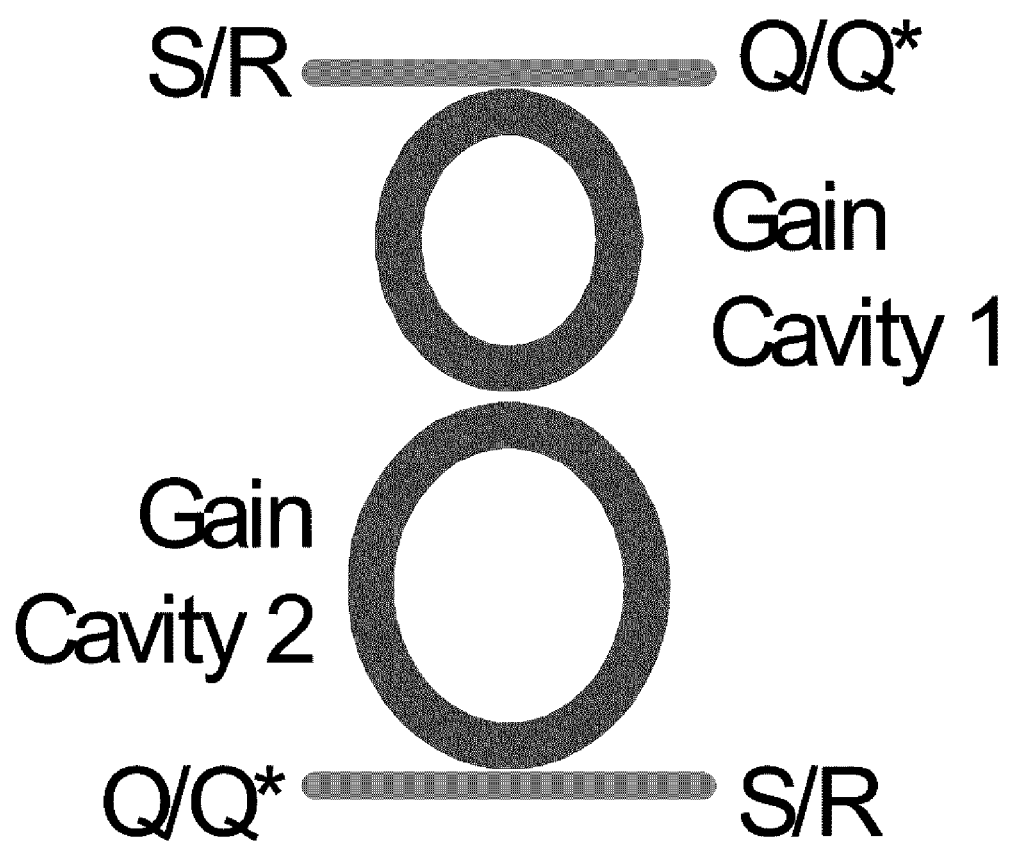

The extension of the original concept that we developed for the new for optical latches (Flip-flops) FIG. 8A, was based on two coupled optical gain cavities fabricated in an environment with an ability to provide almost exact control of optical phase.

In any dual cavity gain arrangement there is a high sensitivity of the modes within the individual cavities to the introduction of an injected signal. The simpler of the two configurations is a continuation of the drive to the simplest possible configuration. It is possible in the above described environment to design two rings having a fixed phase relationship as shown in FIG. 8B. These structures, while faster, would not have quite the same operational flexibility. Further the output amplitudes would need to be compensated for as the longer gain length of one would introduce an added complexity to control of the perturbation of the other The time based action of the proposed coupled optical structures is driven by the fact that the orientation and design of the two structures will force one to introduce a perturbation in the optical mode of the other, The only way to destabilize the configuration is inject a optical signal into the dominant cavity, disrupting its modal structure, allowing the modal formation in the second cavity to occur. When the second cavity is stable, the signal from this free running cavity will inject into the other, preventing a stable mode from forming within it until the modal structure within it is perturbed allowing the other to once again reform the dominant modal structure. Tuning of the coupling cavity between the gain elements allows control of the phase offset.

The optical latch of such an embodiment is triggered on by the set pulse. Much later it is triggered off by a reset pulse which allows the output from the much faster optical bus to be brought into a cell without slowing it down. By adding a second Latch control the gating of information to the bus can be controlled at a much greater rate of operation than could be achieved with the electronic component alone while a similar configuration will allow storage and rapidly gating of information to the optical bus.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for interface between an optical bus and electronic component, the system comprising:
   an optical transfer array for receiving and transmitting data to and from said electronic component;
   an optical decode/encode matrix reading data transmitted from said electronic component uploaded to said transfer array, and writing control data to switches disposed within the transfer array and providing a plurality of addresses for optical guides in said optical bus.

2. The system of claim 1 wherein said transfer array further comprises a plurality of optical latches controlled by said switches, said optical latches being configured to store said data until it can be retrieved by said optical bus.

3. The system according to claim 1 wherein said optical bus is a serial bus.

4. The system according to claim 1 wherein said optical bus is a parallel bus.

5. The system according to claim 1 wherein said latches within said plurality of optical latches comprise first and second interferometers.

6. A system for the transmission of data between an optical bus and an electronic component at a speed independent from a clock speed of said electrical component; said system comprising an optical data storage component communicating with both said optical bus and said electrical component; said optical data storage component being configured to hold data transmitted on said optical bus until said electrical component is available.

7. The system according to claim 6, wherein said storage component comprises an optical latch.

8. The system according to claim 6 wherein said optical storage component provides a dual cavity.

9. The system according to claim 6 wherein said system is provided with high index contrast.

10. The system according to claim 6 wherein said system has low loss.

* * * * *